United States Patent [19]

Hayes et al.

[11] 4,370,358

[45] Jan. 25, 1983

[54] ULTRAVIOLET CURABLE SILICONE ADHESIVES

[75] Inventors: Susan E. Hayes, Schenectady; Richard P. Eckberg, Round Lake, both of N.Y.

[73] Assignee: General Electric Company, Waterford, N.Y.

[21] Appl. No.: 189,258

[22] Filed: Sep. 22, 1980

[51] Int. Cl.$^3$ .......................... C08F 2/50; C08G 77/40
[52] U.S. Cl. .............................. 427/54.1; 204/159.13; 427/208.4; 428/355; 428/356; 428/447; 525/476; 528/33
[58] Field of Search ............... 204/159.13; 427/208.4; 525/476; 528/33

[56] References Cited

U.S. PATENT DOCUMENTS

| | | | |
|---|---|---|---|
| 2,676,182 | 4/1954 | Davbt et al. | 260/448.2 |
| 2,736,721 | 2/1956 | Dexter | 260/42 |
| 2,814,601 | 11/1957 | Currie et al. | 260/29.1 |
| 3,816,282 | 6/1974 | Vivendi | 204/159.13 |
| 3,929,704 | 12/1975 | Horning | 427/207 |
| 3,983,298 | 9/1976 | Hahn et al. | 428/355 |
| 4,026,705 | 5/1977 | Crivello | 204/159.18 |
| 4,160,858 | 7/1979 | Roedel | 528/14 |
| 4,279,717 | 7/1981 | Eckberg et al. | 204/159.13 |

*Primary Examiner*—Wilbert J. Briggs, Sr.
*Assistant Examiner*—A. H. Koeckert

[57] ABSTRACT

An ultraviolet light curable silicone pressure sensitive adhesive is provided which is comprised of an epoxy functional silicone polymer and a combination of standard MQ silicone resins or epoxy functional MQ silicone resins, which can be cured to an adhesive composition in the presence of certain bis(aryl)halonium salt catalysts.

14 Claims, No Drawings

ULTRAVIOLET CURABLE SILICONE ADHESIVES

This application relates to solventless silicone pressure sensitive adhesive compositions and methods of preparation and use, where such silicone adhesive compositions are curable with exposure to ultraviolet radiation.

The coating compositions of the present invention are comprised of low molecular weight epoxy functional polysiloxanes which can be radiation cured to a final product when catalyzed with UV sensitive bis(aryl)-halonium salts.

Silicone compositions have long been used for rendering surfaces adherent. For a long time however, it was necessary that these silicone coatings be applied as a solution within a solvent in order to reduce the viscosity of the coating material so as to be suitable for coating applications. However, although the solvent aids in the application of the coating, it is a highly inefficient process inasmuch as the solvent must thereafter be evaporated. The evaporation of solvent requires large expenditures of energy. Additionally, pollution abatement procedures require that solvent vapors be prevented from escaping into the air. Removal and recovery of all the solvent entail considerable expenditure for apparatus and energy.

Thus, it has been noted that there is a need to provide a solventless adhesive composition which will, however, remain easy to apply to the substrate. Such solventless compositions are sometimes referred to as "100% solids" compositions. The absence of solvent in such compositions lowers the amount of energy required to effect a cure and eliminates the need for expensive pollution abatement equipment. The present invention provides a process for providing novel ultraviolet light curable pressure sensitive adhesives.

Silicone pressure-sensitive adhesives are widely used for electrical tapes, bonding low energy surfaces and in microplating masking operations and can be coated on glass cloth, etched teflon Mylar and other plastics, metals and other such substrates for a variety of purposes. Silicone adhesives are particularly attractive since these compositions are premium products capable of withstanding extreme environmental conditions in industrial applications. Since the use of solvent based products is becoming increasingly unattractive because of rising energy costs and stringent regulation of solvent emissions into the atmosphere, solventless silicone adhesives are ideal substitutes for previously used compositions.

Furthermore, optimum energy savings as well as necessary ecological considerations are both served by the radiation curable compositions of the present invention. Specifically, an ultraviolet (UV) radiation curable silicone adhesive eliminates the need for high oven temperatures and for expensive solvent recovery systems, and is, therefore, a useful and commercially desirable product.

UV curable silicone compositions are not unknown. A patent issued to R. V. Viventi, U.S. Pat. No. 3,816,282, June 11, 1974, and assigned to the General Electric Company, describes a room temperature vulcanizable silicone composition (RTV) in which mercaptoalkyl substituents attached to polysiloxanes add to vinyl functional siloxanes in a free-radical process upon UV irradiation in the presence of free-radical type photosensitizers. But the particular compositions described by Viventi use mercaptoalkyl photoreactive substituents which give rise to offensive odors both in product manufacture and in cured materials.

Ultraviolet light curable silicone paper release compositions have been provided in copending U.S. Patent application Ser. No. 63,648 filed Aug. 3, 1979 now U.S. Pat. No. 4,279,717 by Eckberg and LaRochelle and which is hereby incorporated by reference. But of course these paper release compositions do not provide satisfactory adhesives and in fact serve an entirely opposite function.

Ultraviolet radiation will initiate free-radical cross-linking in the presence of common photosensitizers which are well-known to persons familiar with the art of radiation curing mechanisms. However, silicone compositions which utilize free radical photosensitizers (such as benzophenone) as a curing agent also require stabilizers (such as hydroquinone) to prevent premature reaction and provide reasonable shelf-life. Neither of these agents is required by the present invention.

Commonly available photosensitizers are only slightly soluble in the polydimethylsiloxane or polydimethyldiphenylsiloxane fluids which are among the basic starting materials for these silicone pressure sensitive adhesive compositions and this low solubility causes problems in selection of these necessary ingredients. A further difficulty inherent in free-radical systems is oxygen inhibition which necessitates that the coated substrates be under an inert atmosphere while undergoing irradiation in order to cure within a reasonable amount of time. Use of an inert atmosphere adds complication and expense to the coating and curing process. The requirement for a highly efficient photoinitator severly restricts the structure of the catalyst since it also must be capable of dissolving or dispersing well in the epoxy functional silicone fluid. Copending U.S. application Ser. No. 974,497, filed Dec. 29, 1978, by J. V. Crivello, which is assigned to the same assignee as the present invention and which is hereby incorporated by reference, discloses a UV initiated cationic ring-opening curing mechanism for dimethyl epoxy chainstopped linear polydimethylsiloxane fluids utilizing bis-aryliodonium salts of the following formula,

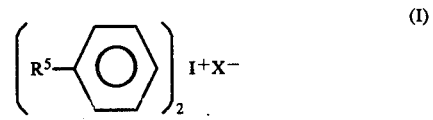

(I)

wherein X represents $SbF_6$, $AsF_6$, $PF_6$, or $BF_4$ and wherein $R^5$ is a $C_{(4-20)}$ organo radical selected from alkyl and haloalkyl and mixtures thereof and n is a whole number equal to 1 to 5, inclusive. The catalysts described in the Crivello application are thick, high viscosity liquids or waxy solids which disperse poorly in low molecular weight epoxy functional silicones utilized by the present invention. These catalysts exhibit typical solubility characteristics of diaryliodonium salts, namely, being soluble in polar organic solvents such as chloroform and acetone but insoluble in non-polar organic solvents such as pentane, hexane and petroleum ether. Such solubility behavior severely limits the utility of these salts for initiating the rapid photocuring of epoxy functional silicone pressure sensitive adhesives.

Although Crivello discloses that R may equal organo radicals selected from alkyl, haloalkyl and branched alkyl groups containing from 4 to 20 carbon atoms, he did not appreciate the unique characteristics of linear alkylate bis(dodecylphenyl)iodonium salts such as are described below. These bis(dodecylphenyl) iodonium salts will rapidly dissolve in the polysiloxane base polymer fluid and disperse throughout, and have been found to be efficient photoinitiator agents. Such salts are particularly well adapted for use in the novel UV curable silicone adhesive compositions provided in the present application.

It is therefore an object of the present invention to provide solventless ultraviolet light curable silicone pressure sensitive adhesive compositions, methods for producing such compositions, as well as methods of use.

Another object is to provide a silicone composition comprised of an epoxy functional siloxane combined with standard or epoxy functional silicone resins which can be catalyzed with bis(aryl)halonium salt photoinitiators.

Another object is to provide methods for coating substrates with novel UV curable silicone adhesives.

Another object is to provide cured silicone pressure sensitive adhesives compositions useful for rendering a variety of substrates adherent.

These and other objects will become apparent upon a careful consideration of applicants' specification and claims.

SUMMARY OF THE INVENTION

The present invention provides solventless ultraviolet radiation curable pressure sensitive silicone adhesive compositions comprised of:

(a) 100 parts by weight of an epoxy functional silicone polymer having the general formula:

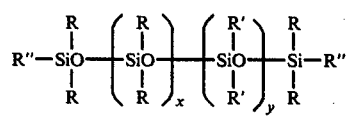

wherein R is a monovalent hydrocarbon radical which will ordinarily be lower alkyl radical such as methyl; R' is the same as R or can particularly be a phenyl radical; and R'' is an epoxy-containing aliphatic or cycloaliphatic radical; having, approximately, 0.01 to 0.05 mole % epoxy content and a viscosity of, approximately, 100 to 5000 centipoise at 25° C., $\chi$ is an integer representing 85 to 100 mole % of the polymer units and y represents 0 to 15 mole percent of the diphenyl units. Typical epoxy functional silicone polymers contain epoxide radicals introduced from a compound selected from 4-vinylcyclohexeneoxide, vinylnorbornenemonoxide, dicyclopentadienemonoxide, and limoneneoxide. A specific example of a suitable epoxy functional silicone polymer is dimethyl-$\beta$-(3,4-epoxycyclohexyl)ethylsilyl chainstopped polydimethyl-diphenyl siloxane copolymer.

To the above described epoxy functional silicone polymer is added 90 to 280 parts by weight and preferably 100 to 203 parts by weight of a silicone MQ resin or a mixture of such resins. It is to be understood that standard MQ resins can be utilized or epoxy functional MQ resins can be utilized, or a combination of both types of resin. The MQ resin or mixture is selected from (i) a first silicone resin comprised of mono-functional $R_3SiO_{0.5}$ and tetra-functional $SiO_2$ units where R is as described above and is usually a lower alkyl substituent such as methyl and the ratio of monofunctional units to tetrafunctional units is, approximately, 0.5 to 2.0:1; or (ii) a second silicone resin comprised of $R_aR_b''SiO_{0.5}$ units and $SiO_2$ units wherein R is as described above and R'' represents monovalent aliphatic and cycloaliphatic epoxide radicals, having an approximate epoxy content of 0 to 0.005 mole percent, the sum of a and b is 3, and wherein the ratio of monofunctional to tetrafunctional units is approximately 0.5 to 2.0:1.

The above described silicone adhesive composition requires the addition of an ultraviolet light sensitive catalyst which is effective for initiating the cure of the composition. Particularly effective catalysts are the UV sensitive cationic halonium salts described above. Ordinarily, per 100 part of epoxy functional silicone polymer, 0.2 to 10 parts by weight and preferably 0.2 to 2 parts of a halonium salt of the general formula (III) will effectively render the silicone composition sensitive to UV radiation.

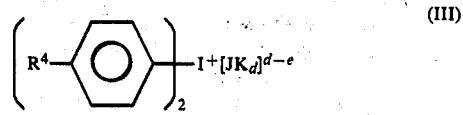

In formula (III) $R^4$ is a linear alkylate monovalent hydrocarbon radical averaging 12 carbon atoms but which may contain a mixture of branched chain alkyl groups having as few as about 10 carbon atoms or as many as about 15 carbon atoms, which is effective for rendering the halonium salt dispersible in silicone oils; J is a metal or metalloid, K is a halogen radical, e is an integer representing the valance of J and is equal to 2 to 7 inclusive, d is an integer having a value up to 8 such that d is greater than e. Particular examples of effective halonium salt catalysts include the linear alkylate bis(docylphenyl)iodonium salts having the general average formula:

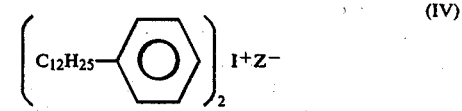

wherein Z is selected from the group consisting of $AsF_6$, $SbF_6$, $BF_4$, and $PF_6$.

The present invention also provides a process for rendering substrates adherent by mixing the above described ingredients and then applying them to a selected substrate such as metal, glass, plastic or fibrous material such as paper and then exposing a coated substrate to an amount of ultraviolet radiation effective for initiating the cure reaction of the adhesive composition.

DESCRIPTION OF THE INVENTION

A low viscosity dimethylhydrogen chainstopped polydimethyldiphenyl siloxane precursor fluid having the general formula:

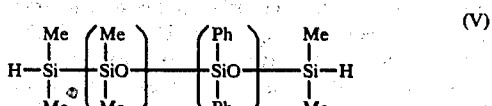

where Me represents methyl radicals and Ph represents phenyl radicals and x and y are defined as above, can be prepared by combining octamethylcyclotetrasiloxane and octaphenylcyclotetrasiloxane with a small amount of tetramethyldisiloxane and an acid catalyst such as sulfuric acid or acid treated clay or other such materials. These reactants are stirred and heated where upon the reaction product can be filtered, and then stripped at 160° C. and 15 mm Hg pressure. The resulting silicone fluid will ordinarily have less than approximately 5% by weight of $H(CH_3)_2SiO_{0.5}$ siloxane units and no detectable $H(CH_3)SiO$ units and will have a viscosity of approximately 50 to 2000 centipoise at 25° C. It is to be understood however that the present invention can utilize a dimethyl siloxane polymer instead of or in conjunction with the dimethyl-diphenyl siloxane copolymer discussed above, with equally satisfactory results, thereby providing an adhesive with varying properties which would be well understood by those skilled in the art.

This methylhydrogen chainstopped polysiloxane fluid can be functionalized with pendent epoxy materials by reacting it with a vinyl or allylic functional epoxy compound as described above such as 4-vinylcyclohexeneoxide, limoneneoxide, vinylnorborenemonoxide, dicyclopentadienemonoxide. The presence of an effective amount of precious metal catalyst will facilitate an addition cure hydrosilation reaction between vinyl functional epoxides and the hydrogen functional siloxane precurser fluid. The precious metal catalyst can be selected from the group of platinium-metal complexes which include the complexes of ruthenium, rhodium, palladium, osmium, iridium and platinum. Such platinum-metal complex catalysts are well known in the silicone art and can be exemplified by the Karstedt catalysts described in U.S. Pat. Nos. 3,715,334, 3,775,452, 3,814,730; the Willing catalyst in U.S. Pat. No. 3,419,593; the Lamoreaux catalyst described in the U.S. Pat. Nos. 3,313,773 and 3,220,972; and the Ashby catalyst described in the U.S. Pat. No. 3,159,662, all of which are hereby incorporated by reference. The selected catalyst is combined with a methylhydrogen silicone oil to which the epoxy-containing material is then added. This solution is heated for a short period of time whereupon an epoxy functionalized silicone fluid having an approximate viscosity of 100 to 2500 centipoise at 25° C. is obtained. It is to be noted that in an alternative embodiment of the present invention the hydrogen functional siloxane precursor fluid may be partially crosslinked by the addition of up to approximately 0.005 moles of an unsaturated species such as methylvinyl siloxane tetramer per 100 g of the precursor fluid. This reaction can utilize the same precious metal catalyzed hydrosilation reaction as described above for the epoxy group addition, or it can be carried out separately.

Silicone pressure sensitive adhesives ordinarily utilize as one of their constituent ingredients a silicone MQ resin. Such MQ resins are known in the silicone art and can be prepared according to the typical procedure described below. However the compositions and processes of the present invention are also capable of utilizing these silicone MQ resins which have themselves been modified with epoxy-containing materials which are the same as or similar to the epoxy constituents of the above described low viscosity silicone oil. Therefore, the adhesive of the present invention can include combinations of both types of MQ resins or can contain all of either type of resin i.e. standard MQ resins or epoxy modified MQ resins.

Silicone MQ resins have long been known in the art and are comprised principally of monofunctional $R_3SiO_{0.5}$ units and tetrafunctional $SiO_2$ units. Such resins can be provided in accordance with the procedures described in U.S. Pat. Nos. 2,676,182 and 2,736,721 both of which are hereby incorporated by reference. These MQ resins can generally be provided by combining water and sodium silicate which then is further combined with an aqueous acid such as HCl. After vigorous stirring, alcohol is added and after additional stirring the mixture is combined with trimethylchlorosilane and refluxed for several hours whereupon an organic solvent is then added. The resin solution can then be separated from the aqueous layer and stripped to reduce acidity and provide the desired silicone solids level.

The epoxy functionalized MQ resins mentioned above can be provided in an analogous fashion. Again water and sodium silicate are combined and poured quickly into a container of aqueous acid. The mixture is stirred vigorously whereupon isopropanol is then added. After an additional period of agitation a mixture of trimethylchlorosilane, dimethylchlorosilane, and toluene is slowly added. The aqueous portion of the reaction product is then discarded and the resin portion can be stripped of its solvents. The resin is then neutralized with small amounts of ammonia gas. Next the stripped and dried resin is combined with an approximately equal amount by weight of an organic solvents such as hexane. This mixture is then combined with approximately 1% by weight of the epoxy-containing vinyl- or allylic-functional material. This combined mixture is then catalyzed with a small amount of platinum catalyst and the mixture is stirred at reflux for several hours. When the solvent is evaporated, there remains a dry friable epoxy functional silicone MQ resin.

The pressure sensitive adhesive compositions of the present invention are generally prepared by dissolving the selected resins in hexane to provide a 60% silicone solid formulation whereupon this solution is further combined with the epoxy functional oil and the UV sensitive catalyst. After the mixture is stripped to 98 to 100% silicone solids it becomes an effective silicone pressure sensitive adhesive which can then be coated onto the selected surface which is to become adherent.

The preferred UV-light initiator is a diaryl iodonium salt derived from "linear alkylate" dodecylbenzene. Such salts have the following general formula:

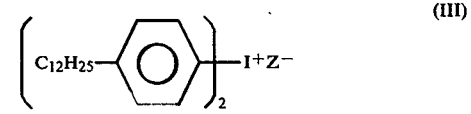

(III)

wherein Z equals $SbF_6$, $AsF_6$, $PF_6$, or $BF_4$. These bis(4-dodecylphenyl)iodonium salts are very effective initiators for the UV cure of a wide range of epoxy functional silicones.

"Linear alkylate" dodecylbenzene is known commercially and is prepared by Friedal-Craft alkylation of benzene with a $C_{11}$–$C_{13}$ α-olefin cut. Consequently, the alkylate contains a preponderance of branched chain dodecylbenzene, but there may, in fact, be large amounts of other isomers of dodecylbenzene such as ethyldecylbenzene, plus isomers of undecylbenzene, tridecylbenzene as well as some other branched chain alkyl groups having as few as 10 or as many as 15 carbon atoms. Note, however, that such a mixture is responsible for the dispersive character of the linear alkylate derived catalyst and is an aid in keeping the material fluid. These catalysts are free-flowing viscous fluids at room temperature.

Epoxy functional silicone pressure sensitive adhesives of the present invention can be cured to their final state with an effective amount of ultraviolet radiation. In order to effect such a cure, a cationic UV catalyst is incorporated into the epoxy functional material. It has been found that a bis-aryliodonium salt containing a linear alkylate dodecyl substituent is a very effective UV initiator. Particularly effective, for example, is bis(4-dodecylphenyl)-iodonium hexafluoroantimonate having formula (III) which can be synthesized in the following fashion. A two liter three-necked round bottom flask was fitted with a mechanism stirrer, a thermometer, a nitrogen inlet and a pressure equalizing addition funnel. To this reaction vessel was added approximately 100 parts by weight linear alkylate dodecylbenzene. To this was added approximately 30 to 60 parts by weight of potassium iodate and approximately 60 to 100 parts by weight of acetic anhydride as well as approximately 150 to 200 parts by weight glacial acetic acid. The mixture within the reaction vessel is continuously stirred and cooled to a temperature of approximately $-10°$ C. to $+10°$ C. A dry ice acetone bath is effective for reducing the temperature. Approximately 80 to 120 parts by weight of an acid solution is added to the contents of the reaction vessel to form a reaction mixture. The acid solution can be a mixture of concentrated sulfuric acid and additional glacial acetic acid. The acid solution may comprise a mixture of approximately 12% to 60% by weight of concentrated sulfuric acid and approximately 40% to 80% by weight glacial acetic acid. This acid solution is added to the reaction mixture at a rate effective for maintaining the reaction mixture temperature at approximately $-5°$ C. to $+5°$ C. After completion of the addition, a thick orange slurry is obtained and this reaction mixture can be slowly stirred for approximately 2 to 4 hours at near $0°$ C. The reaction mixture is then allowed to slowly warm to approximately $20°$ C. to $30°$ C. and the stirring is continued for approximately 8 to 15 hours.

As the temperature of the reaction mixture approaches $20°$ C., moderate exothermic reactions may occur but these can be quickly controlled by reimmersing the reaction vessel into the cooling bath. The reaction mixture is then diluted with approximately 500 to 1,000 parts by weight of water and to this stirred mixture was added approximately 5 to 10 parts by weight reducing agent sodium bisulfite or another Group Ia or Group IIa metal bisulfite.

Approximately 30 to 60 parts by weight of sodium hexafluoroantimonate is added to the reaction mixture. To this mixture is added approximately 100 to 150 parts of pentane and the mixture is stirred in the dark for approximately 2 to 4 hours. The aqueous and non-aqueous layers are then separated. A separatory funnel may be used. After separation, the aqueous layer can be further extracted with additional pentane. The pentane extracts are then combined with the non-aqueous layer and this mixture is washed with fresh water and then concentrated in a vacuum to afford a reddish-brown oil. This oil is then stored in the dark. This oil is an approximately 50% pure reaction mixture of bis(4-dodecylpenyl)iodonium hexafluoroantimonate. Although synthesis by the above-described method provides a bis-aryl iodonium salt which is only about 50% pure, nevertheless, the salt is quite effective for catalyzing a UV light initiated cure reaction. These bis aryl iodonium salt catalysts can be further purified if desired in accordance with the method described in copending U.S. application Ser. No. 180,539 filed Aug. 25, 1980 which is hereby incorporated by reference.

The catalyzed adhesive composition can be coated on a substrate such as paper, glass, metal foil, plastic or other synthetic or fibrous substrates by any of various methods such as knife-over-roll, gravure, brush, spray and reverse roll coating. After the selected substrate has been coated to a preselected thickness it is exposed for a brief amount of time (ordinarily less than approximately one second) by some source of ultraviolet radiation such as for example Hanovia medium pressure mercury vapor ultraviolet lamps. The coating will usually be approximately 1.0 to 5.0 mils in thickness since thinner coats are less effective and thicker coats are relatively more difficult to cure properly and efficiently. The substrate coated with the cured adhesive composition can now effectively be adhered to other substrates upon application of moderate activating pressure.

EXAMPLE 1

The pressure sensitive adhesives of the present invention can be provided by first obtaining a suitable methylhydrogensiloxane precurser fluid. Such a precursor fluid can be obtained by combining 1293 grams of octamethylcyclotetrasiloxane and 40 grams of tetramethylsiloxane with 40 grams of Filtrol 20 acid clay catalyst. These combined reactants were stirred at $50°$ C. for three hours, whereupon the temperature was raised to $100°$ C. and stirring was continued for additional three hours. The reaction product was filtered through Fuller's earth and Celite 545 and then stripped at $160°$ C. and 15 mm pressure. The resulting product contained approximately 2.7% by weight of $H(CH_3)_2SiO_{0.5}$ units, had no detectable $H(CH_3)SiO$ units, and had a viscosity of approximately 527 centipoise at $25°$ C. This methylhydrogen chainstopped polysiloxane fluid was made epoxy-functional in the following manner: 101 grams of the silicone precursor fluid was combined with 0.013 grams of a platinum-complex catalyst containing 5 weight percent platinum metal. To this catalyzed oil was added 3.8 grams of 4-vinylcyclohexeneoxide whereupon the solution was heated at $85°$ C. for 1.5 hours; the resulting epoxy functional silicone oil had a final viscosity of approximately 540 centipoise at $25°$ C. Next was prepared a cyclohexeneoxide-functional MQ silicone resin. 1,040 grams of water were combined with 728 grams of sodium silicate which was then poured quickly into 648 grams of aqueous hydrochloric acid (16.5% solution). This mixture was stirred vigorously at $23°$ C. for 10 minutes whereupon 696 grams of isopropanol was quickly added. After an additional 10 minute period of vigorous agitation, a mixture of 315 grams trimethylchlorosilane, 2.7 grams dimethylchlorosilane, and 189 grams of toluene was then added slowly over a third 10 minute period. The aqueous portion of the reaction product was then discarded and the resin portion was stripped at $126°$ C. and 760 mm Hg. The resulting resin was neutralized with a very small amount of ammonia gas which was added until the addition of a few drops of the resin to a solution of tetrabromophenophthalein ethyl ester in toluene and isopropanol no longer changed the green color of the indicator solution. The resulting MQ resin contained approximately 0.7 weight percent of $H(CH_3)_2SiO_{0.5}$ which enabled it to become an epoxy functional MQ resin in the following manner: First, the MQ resin was dried at 90° C. whereupon 280 grams of MQ resin was combined with 280 grams of hexane and 3.8 grams of 4-vinylcyclohexeneoxide as well as 0.066 grams of a platinum-through E) each contained approximately 0.5% by weight epoxy functionality in the form of the vinylcyclohexenoxide moiety. Samples A and B were coated to a thickness of 2.0 mils on Mylar tape, while Samples C, D, and E were coated to a thickness of 3.5 mils. Each sample was irradiated by the PPG ultraviolet processor until cured whereupon the peel strength at 180° was determined for each. Viscosity is in centipoise at 25° C.

TABLE I

| SAMPLE | SILICONE OIL % Epoxy | SILICONE OIL Viscosity | MQ RESIN % Epoxy | COATING THICKNESS Mils | PEEL STRENGTH (oz/in) | ELAPSED TIME |
|---|---|---|---|---|---|---|
| A | 2.7 | 540 | 0.0 | 2.0 | 29 | upon cure |
|   |     |     |     |     | 29 | after 2 hrs. |
|   |     |     |     |     | 15 | after 72 hrs. |
| B | 1.5 | 2500 | 0.5 | 2.0 | 37 | upon cure |
| C | 2.7 | 540 | 0.5 | 3.5 | 38 | upon cure |
|   |     |     |     |     | 12 | after 24 hrs. |
| D | 1.7 | 2200 | 0.5 | 3.5 | 33 | upon cure |
| E | 5.7 | 190 | 0.5 | 3.5 | 20 | upon cure | complex catalyst containing 5 weight percent platinum metal. The combined reactants were then stirred at reflux for 16 hours whereupon the solvent was evaporated at 90° C., leaving a dry friable epoxy functional MQ resin. The pressure sensitive adhesive of the present invention was then prepared by dissolving 6 grams of standard MQ resin and 6 grams of cyclohexineoxide functionalized MQ resin in 8 grams of hexane, to form a 60% silicone solids resin solution. This solution was then combined with 12 grams of the cyclohexeneoxide chainstopped silicone oil and 0.24 grams of a 50% solution of bis(dodecylphenyl)iodonium hexafluoroantimonate in methanol. The catalyzed mixture was then stripped until the composition was at 98 to 100% silicone solids. The resulting product was a thick, translucent liquid which was yellowish in color. The composition was then coated at a thickness of 2.0 mils onto Mylar tape which was also 2.0 mils thick. The coated substrate was irradiated for 0.6 seconds by two Hanovia medium-pressure mercury vapor ultraviolet lamps which deliver to the sample approximately 200 watts per square inch of focused ultraviolet radiation. These lamps were contained in a PPG Model QU-1202 processor unit. The peel strength of the cured adhesive composition was 25 oz. per inch when measured immediately after curing, as well as when measured after two hours. After three days the peel strength was 13 oz. per inch. Additionally, there was no cohesive failure or adhesive transfer.

EXAMPLE 2

Other useful silicone pressure sensitive adhesives of the present invention can be prepared according to the formulations given in Table I. In the following table, each sample represents a silicone pressure sensitive coating composition formulated in accordance with the present invention. The silicone oils are dimethyl-4-vinylcyclohexeneoxide chainstopped polydimethyl siloxane fluids, each having the indicated viscosity in centipoise at 25° C. The weight % epoxy content is given in the following table in the form of vinylcyclohexenoxide by weight in an average polysiloxane molecule. Of course it is to be understood that the present invention is not limited to this epoxide species, as discussed above. The resin formulation for Sample A contained a standard MQ resin comprised of $(CH_3)_3SiO_{0.5}$ units and $SiO_2$ units but without any epoxide functionality. The remaining resin formulations (Samples B Thus it can be seen that several processing parameters such as viscosity, epoxy content or coating thickness can be varied in order to provide silicone adhesives having varied peel strength and other properties.

During the formulation of the coating compositions described in Table 1, it was found that Sample A flowed freely, even at greater than 99% silicone solids and was easily coated onto the Mylar tape. Sample B, which started with a silicone oil of relatively much higher viscosity, was a stiff composition which was relatively difficult to spread even at 95% silicone solids, yet it had a greater peel strength compared to Sample A.

Both samples C and E flowed freely and were coated easily at approximately 99% silicone solids. But again, Sample D which had a relatively higher viscosity was a stiff composition which was more difficult to spread. Note that the silicone oil in Sample E additionally contained 0.46 weight percent methylvinyl siloxane tetramer and is an exampled of the partially crosslinked species discussed above.

We claim:

1. A solventless ultraviolet radiation curable composition for forming a pressure sensitive silicone adhesive comprised of:
   (a) 100 parts by weight of an epoxy functional silicone polymer having the general formula:

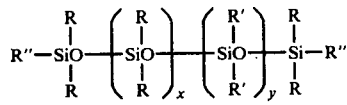

wherein R is a monovalent hydrocarbon radical, and R' is the same as R or a phenyl radical and R" is an epoxy-containing aliphatic or cycloaliphatic radical; having, approximately, 0.01 to 0.05 mole % epoxy content and a viscosity of, approximately, 100 to 5000 centipoise at 25° C., $\chi$ is an integer representing 85 to 100 mole percent of the polymer units and y represents 0 to 15 mole percent diphenyl siloxy units;
   (b) 90 to 280 parts by weight of a silicone MQ resin or mixture of such resins selected from:
      (i) a first silicone resin comprised of mono-functional $R_3SiO_{0.5}$ units and tetra-functional $SiO_2$ units where R is as described above and the ratio of mono-functional units to tetra-functional units is, approximately, 0.5 to 2.0:1; or (ii) a second silicone resin comprised of $R_aR_b''SiO_{0.5}$ units and $SiO_2$ units wherein R is as described above and R" represents aliphatic or cycloaliphatic epoxide radicals; having, approximately, 0 to 0.005 mole % epoxy content, the sum of a band b is 3, and wherein the ratio of mono-functional to tetra-functional units is approximately 0.5 to 2.0:1, and (c) an amount of ultraviolet light sensitive catalyst effective for initiating the cure of said silicone adhesive composition.

2. A composition as in claim 1 wherein said epoxy functional silicone polymer contains epoxide radicals introduced from a compound selected from 4-vinylcyclohexeneoxide, vinylnorbornenemonoxide, dicyclopentadienemonoxide and limoneneoxide.

3. A composition as in claim 2 wherein said epoxy functional silicone polymer is dimethyl-β-(3,4-epoxycyclohexyl)ethyl silyl chainstopped poly dimethyl-diphenyl siloxane copolymer.

4. A composition as in claim 1 wherein said catalyst is 0.2 to 10 parts by weight per 100 parts epoxy functional silicone polymer of a halonium salt of the formula:

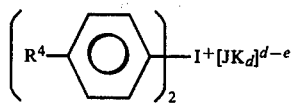

wherein $R^4$ is a linear alkylate monovalent hydrocarbon radical containing an average of 12 carbon atoms, J is a metal or metalloid, K is a halogen radical, e is an integer representing the valence of J and is equal to 2 to 7 inclusive, d is an integer having a value up to 8 such that d is greater than e.

5. A composition as in claim 4 wherein said catalyst is selected from linear alkylate halonium salts of the average formula:

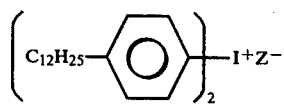

wherein Z is selected from the group consisting of $AsF_6$, $SbF_6$, $BF_4$, and $PF_6$.

6. A substrate coated with the composition of claim 1.

7. A method for providing a solventless ultraviolet radiation curable composition for forming a pressure sensitive silicone adhesive comprising the steps of combining:

(a) 100 parts by weight of an epoxy functional silicone polymer having the general average formula:

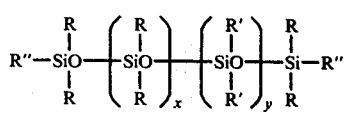

wherein R is a monovalent hydrocarbon radical and R' is the same as R or a phenyl radical and R" is an epoxy-containing aliphatic or cycloaliphatic radical; having, approximately, 0.01 to 0.05 mole % epoxy content and a viscosity of, approximately, 100 to 5000 centipoise at 25° C., $\chi$ is an integer representing 85 to 100 mole percent of the polymer units and y represents 0 to 15 mole percent diphenyl siloxy units;

(b) 90 to 280 parts by weight of a silicone MQ resin or mixture of such resins selected from:

(i) a first silicone resin comprised of mono-functional $R_3SiO_{0.5}$ units and tetra-functional $SiO_2$ units where R is as described above and the ratio of mono-functional units to tetra-functional units is, approximately, 0.5 to 2.0:1, or (ii) a second silicone resin comprised of $R_aR_b''SiO_{0.5}$ units and $SiO_2$ units wherein R is as described above and R" represents aliphatic or cycloaliphatic epoxide radicals; having, approximately, 0 to 0.005 mole % epoxy content, the sum of a and b is 3, and wherein the ratio of mono-functional to tetra-functional units is approximately 0.5 to 2.0:1, and (c) an amount of ultraviolet light sensitive catalyst effective for initiating the cure of said silicone adhesive composition.

8. A method as in claim 7 wherein said epoxy functional silicone polymer contains epoxide radicals introduced from a compound selected from 4-vinylcyclohexeneoxide, vinylnorbornenemonoxide, dicyclopentadienemonoxide and limoneneoxide.

9. A method as in claim 10 wherein said epoxy functional silicone polymer is dimethyl-β-(3,4-epoxycyclohexyl)ethyl silyl chainstopped poly dimethyl-diphenyl siloxane copolymer.

10. A method as in claim 8 wherein said catalyst is 0.2 to 10 parts by weight per 100 parts epoxy functional silicone polymer of a halonium salt of the formula:

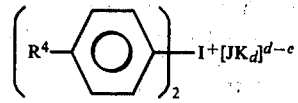

wherein $R^4$ is a linear alkylate monovalent hydrocarbon radical containing an average of 12 carbon atoms, J is a metal or metalloid, K is a halogen radical, e is an integer representing the valence of J and is equal to 2 to 7 inclusive, d is an integer having a value up to 8 such that d is greater than e.

11. A method as in claim 10 wherein said catalyst is selected from linear alkylate halonium salts of the average formula:

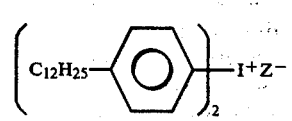

wherein Z is selected from the group consisting of $AsF_6$, $SbF_6$, $BF_4$, and $PF_6$.

12. A method of providing a solventless ultraviolet radiation curable composition for forming a silicone pressure sensitive adhesive comprising the steps of partially crosslinking a dimethylhydrogen chainstopped polydimethylsiloxane precursor fluid with up to approximately 0.005 moles of an unsaturated siloxane composition; reacting said partially crosslinked precursor fluid with an epoxy-containing aliphatic or cycloaliphatic species thereby providing a partially crosslinked epoxy functional silicone fluid; combining said epoxy functional fluid with a silicone MQ resin or mixture of such resins selected from:
(i) a first silicone resin comprised of mono-functional $R_3SiO_{0.5}$ units and tetra-functional $SiO_2$ units where R is as described above and the ratio of mono-functional units to tetra-functional units is, approximately, 0.5 to 2.0:1, or
(ii) a second silicone resin comprised of $R_aR_b''SiO_{0.5}$ units and $SiO_2$ units wherein R is as described above R" represents aliphatic or cycloaliphatic epoxide radicals; having, approximately, 0 to 0.005 mole % epoxy content, the sum of a and b is 3, and wherein the ratio of mono-functional to tetra-functional units is approximately 0.5 to 2.0:1; and adding an amount of ultraviolet light sensitive catalyst effective for initiating the cure of said curable composition.

13. The cured curable composition of claims 1 and 6.

14. A method as in claim 7 or 12 further comprising the steps of: coating said curable composition on a substrate selected from paper, plastic, metal or glass substrates; and exposing said coated silicone adhesive composition with an amount of ultraviolet radiation effective for facilitating a cure reaction of said silicone adhesive composition on said substrate.

* * * * *